(No Model.)
C. E. TOWER.
VEHICLE WHEEL.
No. 308,292. Patented Nov. 18, 1884.
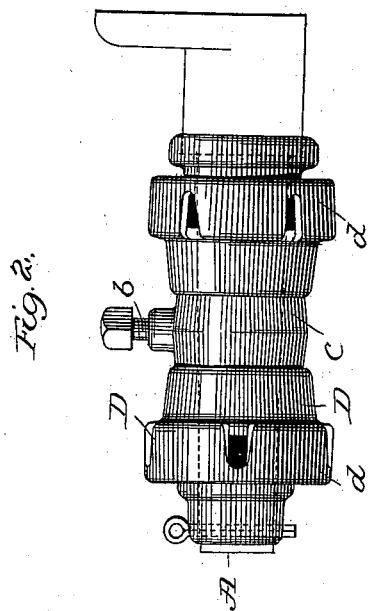
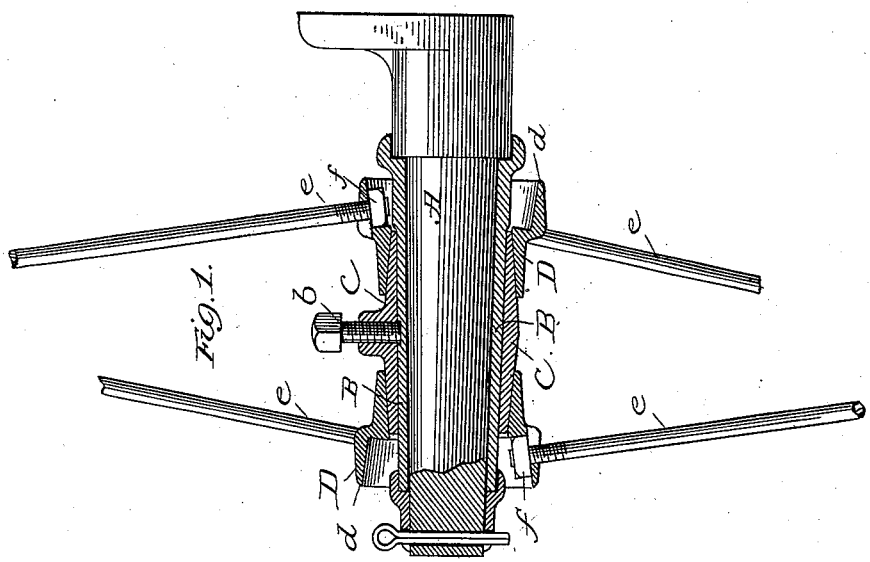
Attest:
Inventor
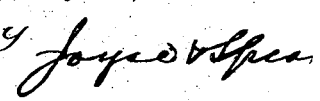

UNITED STATES PATENT OFFICE.

CALEB E. TOWER, OF SOUTH BEND, INDIANA, ASSIGNOR TO THE ECONOMIST PLOW COMPANY, OF SAME PLACE.

VEHICLE-WHEEL.

SPECIFICATION forming part of Letters Patent No. 308,292, dated November 18, 1884.

Application filed January 2, 1884. Renewed September 15, 1884. (No model.)

*To all whom it may concern:*

Be it known that I, CALEB E. TOWER, of South Bend, in the county of St. Joseph and State of Indiana, have invented a new and useful Improvement in Suspension or Spider Wheels; and I do hereby declare that the following is a full, clear, and exact description of the same.

My invention is an improvement in suspension or "spider" wheels, the improvement relating more particularly to the hub. The improved wheel is designed more particularly for the wheels of sulky-plows, but is applicable to wheels for other purposes.

My object is to produce a cheap and strong hub; and the invention consists of details of construction, all set forth fully hereinafter.

In the accompanying drawings, Figure 1 represents a central longitudinal section through the hub, a portion of the spokes being shown in side elevation. Fig. 2 is a side elevation of the hub.

In the drawings, A represents the journal of the axle. On this is fitted a sleeve, B, adapted to turn on said journal and to form the bearing of the hub. Over this is placed another shorter sleeve, C, with a cylindrical bore fitting the sleeve B but tapering on the outside from the center to the ends, and held to the sleeve B, by a set-screw, $b$, or in any other convenient way. Over the tapering ends of this outer sleeve are placed rings D D, having tapering inner surfaces to fit the sleeve C. These rings have an enlarged flange, $d$, cast with holes, to receive the spokes $e$, which are held by nuts $f$, which lie in the space formed by the enlarged flange, and abut against the outer ends of the rings. This prevents the nuts from turning, and the spokes (which are round rods) are drawn up by turning them into the nuts with ordinary pipe-tongs. The rim is formed in the ordinary way, and the spokes are held therein by heads, being passed through from the outside to the hubs. The strain upon the spokes tends to draw the rings toward the center upon the tapering sleeve C, and without other fastening holds the parts securely in place.

All the parts of the hub may be made of malleable iron, and are consequently inexpensive, and the construction is such that they are not liable to break in use.

I claim as my invention—

In a suspension-wheel, and in combination, a sleeve, B, a second sleeve fitted thereto, and having a double tapering exterior surface, the rings having corresponding interior taper and perforated flanges, the nuts, and the spokes, all substantially as described.

In testimony whereof I have signed my name to this specification in the presence of two subscribing witnesses.

CALEB E. TOWER.

Witnesses:
JOHN M. CHAPMAN,
EDWIN R. KIMBLE.